United States Patent
Gay et al.

(10) Patent No.: US 10,637,933 B2
(45) Date of Patent: **\*Apr. 28, 2020**

(54) METHOD AND APPARATUS FOR TRANSFERRING INFORMATION BETWEEN ELECTRONIC DEVICES

(71) Applicant: Logitech Europe S.A, Lausanne (CH)

(72) Inventors: Olivier Gay, Lausanne (CH); Mathieu Meisser, Lutry (CH); Thomas Luc Rouvinez, Evionnaz (CH); Nicolas Sasselli, Belmont-sur-Lausanne (CH); Remy Zimmermann, Pully (CH)

(73) Assignee: LOGITECH EUROPE S.A., Lausanne (CH)

( * ) Notice: Subject to any disclaimer, the term of this patent is extended or adjusted under 35 U.S.C. 154(b) by 546 days.

This patent is subject to a terminal disclaimer.

(21) Appl. No.: 15/368,306

(22) Filed: Dec. 2, 2016

(65) Prior Publication Data

US 2017/0346880 A1 Nov. 30, 2017

Related U.S. Application Data

(63) Continuation-in-part of application No. 15/166,113, filed on May 26, 2016, now Pat. No. 9,549,153.

(51) Int. Cl.
*G06F 15/167* (2006.01)
*H04L 29/08* (2006.01)
(Continued)

(52) U.S. Cl.
CPC ........ *H04L 67/146* (2013.01); *H04L 65/1069* (2013.01); *H04L 65/403* (2013.01);
(Continued)

(58) Field of Classification Search
CPC ..... H04L 67/10; H04L 67/1097; H04L 67/18; H04L 67/303; H04L 67/306; H04L 67/325; H04L 67/327
(Continued)

(56) References Cited

U.S. PATENT DOCUMENTS 4,476,463 A 10/1984 Ng et al.
4,677,428 A 6/1987 Bartholow
(Continued)

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.

(Continued)

*Primary Examiner* — Farzana B Huq
(74) *Attorney, Agent, or Firm* — Patterson + Sheridan, L.L.P.

(57) ABSTRACT

Embodiments of the disclosure provided herein generally include a system and a method of configuring and/or controlling the transfer of information between two or more electronic devices due to the interaction of an electronic device and a host identifier signal generating system. Embodiments of the disclosure may include a system and a method of distributing useful information received by or contained within a memory of the electronic device based on the receipt of a host identifier signal. The electronic device may then perform one or more desirable functions or processes based the portable electronic device's interaction with the host identifier signal generating system. Some aspects of the invention may include an apparatus, method and/or one or more computing device software applications that are configured to more easily setup, configure and/or control the presentation, distribution, collection and/or analysis of program information residing in a first electronic device to a second electronic device based on the interaction of the first electronic device with the host identifier signal generating system.

24 Claims, 3 Drawing Sheets

(51) Int. Cl.
*H04N 7/14* (2006.01)
*H04W 4/06* (2009.01)
*H04L 29/06* (2006.01)

(52) U.S. Cl.
CPC ............. *H04N 7/147* (2013.01); *H04W 4/06* (2013.01); *H04M 2250/12* (2013.01)

(58) Field of Classification Search
USPC ................................ 709/213, 217, 224–227
See application file for complete search history.

(56) References Cited

U.S. PATENT DOCUMENTS

| | | |
|---|---|---|
| 4,705,942 A | 11/1987 | Budrikis et al. |
| 4,785,564 A | 11/1988 | Gurtler |
| 4,794,634 A | 12/1988 | Torihata et al. |
| 5,117,071 A | 5/1992 | Greanias et al. |
| 5,434,617 A | 7/1995 | Bianchi |
| 5,488,204 A | 1/1996 | Mead et al. |
| 5,568,292 A | 10/1996 | Kim |
| 5,570,113 A | 10/1996 | Zetts |
| 5,610,629 A | 3/1997 | Baur |
| 5,659,332 A | 8/1997 | Ishii et al. |
| 5,677,744 A | 10/1997 | Yoneda et al. |
| 5,790,106 A | 8/1998 | Hirano et al. |
| 5,825,352 A | 10/1998 | Bisset et al. |
| 5,880,411 A | 3/1999 | Gillespie et al. |
| 5,914,708 A | 6/1999 | LaGrange et al. |
| 5,959,617 A | 9/1999 | Bird et al. |
| 6,002,387 A | 12/1999 | Ronkka et al. |
| 6,100,538 A | 8/2000 | Ogawa |
| 6,133,906 A | 10/2000 | Geaghan |
| 6,188,391 B1 | 2/2001 | Seely et al. |
| 6,323,846 B1 | 11/2001 | Westerman et al. |
| 6,392,694 B1 | 5/2002 | Bianchi |
| 6,441,362 B1 | 8/2002 | Ogawa |
| 6,504,530 B1 | 1/2003 | Wilson et al. |
| 6,529,189 B1 | 3/2003 | Colgan et al. |
| 6,597,348 B1 | 7/2003 | Yamazaki et al. |
| 6,603,867 B1 | 8/2003 | Sugino et al. |
| 6,611,281 B2 | 8/2003 | Strubbe |
| 6,667,740 B2 | 12/2003 | Ely et al. |
| 6,681,034 B1 | 1/2004 | Russo |
| 6,731,334 B1 | 5/2004 | Maeng et al. |
| 6,803,906 B1 | 10/2004 | Morrison et al. |
| 6,829,391 B2 | 12/2004 | Comaniciu et al. |
| 6,856,259 B1 | 2/2005 | Sharp |
| 7,015,894 B2 | 3/2006 | Morohoshi |
| 7,084,933 B2 | 8/2006 | Oh et al. |
| 7,098,894 B2 | 8/2006 | Yang et al. |
| 7,298,733 B2 | 11/2007 | Sakai et al. |
| 7,349,008 B2 | 3/2008 | Rui et al. |
| 7,372,455 B2 | 5/2008 | Perski et al. |
| 7,433,327 B2 | 10/2008 | Harville et al. |
| 7,567,242 B2 | 7/2009 | Perkins et al. |
| 7,612,767 B1 | 11/2009 | Griffin et al. |
| 7,649,527 B2 | 1/2010 | Cho et al. |
| 7,663,607 B2 | 2/2010 | Hotelling et al. |
| 7,688,315 B1 | 3/2010 | Gettemy et al. |
| 7,746,401 B2 | 6/2010 | Wu et al. |
| 7,855,718 B2 | 12/2010 | Westerman |
| 7,876,923 B2 | 1/2011 | Finnegan et al. |
| 7,940,432 B2 | 5/2011 | Shih et al. |
| 8,094,133 B2 | 1/2012 | Sato et al. |
| 8,094,193 B2 | 1/2012 | Peterson et al. |
| 8,122,384 B2 | 2/2012 | Partridge et al. |
| 8,130,203 B2 | 3/2012 | Westerman |
| 8,134,542 B2 | 3/2012 | Hagen et al. |
| 8,237,764 B1 | 8/2012 | Chen et al. |
| 8,243,041 B2 | 8/2012 | Westerman |
| 8,243,049 B2 | 8/2012 | Vos |
| 8,261,211 B2 | 9/2012 | Pahud et al. |
| 8,278,571 B2 | 10/2012 | Orsley |
| 8,284,254 B2 | 10/2012 | Romanowich et al. |
| 8,358,328 B2 | 1/2013 | Friel et al. |
| 8,368,752 B2 | 2/2013 | Lin et al. |
| 8,471,889 B1 | 6/2013 | Lee et al. |
| 8,547,414 B2 | 10/2013 | Sheeley |
| 8,659,638 B2 | 2/2014 | Chao et al. |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,237,307 B1 | 1/2016 | Vendrow |
| 9,270,941 B1 | 2/2016 | Lavelle |
| 9,338,395 B2 | 5/2016 | Wang et al. |
| 2002/0106137 A1 | 8/2002 | Chen et al. |
| 2002/0175903 A1 | 11/2002 | Fahraeus et al. |
| 2004/0003409 A1 | 1/2004 | Berstis |
| 2004/0008189 A1 | 1/2004 | Clapper et al. |
| 2004/0095333 A1 | 5/2004 | Morag et al. |
| 2006/0026521 A1 | 2/2006 | Hotelling et al. |
| 2006/0250381 A1 | 11/2006 | Geaghan |
| 2007/0024706 A1 | 2/2007 | Brannon et al. |
| 2007/0030258 A1 | 2/2007 | Pittel et al. |
| 2008/0128180 A1 | 6/2008 | Perski et al. |
| 2008/0150918 A1 | 6/2008 | Hagen et al. |
| 2008/0297487 A1 | 12/2008 | Hotelling et al. |
| 2008/0309625 A1 | 12/2008 | Krah et al. |
| 2009/0174530 A1 | 7/2009 | Yen et al. |
| 2009/0262637 A1 | 10/2009 | Badaye et al. |
| 2010/0013796 A1 | 1/2010 | Abileah et al. |
| 2010/0020037 A1 | 1/2010 | Narita et al. |
| 2010/0051356 A1 | 3/2010 | Stern et al. |
| 2010/0252335 A1 | 10/2010 | Orsley |
| 2010/0289754 A1 | 11/2010 | Sleeman et al. |
| 2010/0315384 A1 | 12/2010 | Hargreaves et al. |
| 2011/0043489 A1 | 2/2011 | Yoshimoto et al. |
| 2011/0050843 A1 | 3/2011 | Cheng et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2012/0019611 A1 | 1/2012 | Wu et al. |
| 2012/0068964 A1 | 3/2012 | Wright et al. |
| 2012/0158629 A1 | 6/2012 | Hinckley et al. |
| 2012/0169883 A1 | 7/2012 | Chang et al. |
| 2012/0206330 A1 | 8/2012 | Cao et al. |
| 2012/0223960 A1 | 9/2012 | Chiang et al. |
| 2012/0268626 A1 | 10/2012 | Lu et al. |
| 2012/0327041 A1 | 12/2012 | Harley et al. |
| 2012/0327042 A1 | 12/2012 | Harley et al. |
| 2013/0007499 A1* | 1/2013 | Moy ................... G06F 3/1423 713/400 |
| 2013/0183958 A1 | 7/2013 | Wesby |
| 2013/0329003 A1 | 12/2013 | Hsia et al. |
| 2013/0335508 A1 | 12/2013 | Mauchly |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0111600 A1 | 4/2014 | Schaefer et al. |
| 2014/0187149 A1* | 7/2014 | Lortz ................... H04W 76/14 455/41.1 |
| 2014/0313282 A1 | 10/2014 | Ma et al. |
| 2014/0313346 A1 | 10/2014 | Huang et al. |
| 2015/0022636 A1 | 1/2015 | Savransky |
| 2015/0244853 A1* | 8/2015 | Shin ................... H04W 4/21 455/420 |
| 2016/0291861 A1 | 10/2016 | Song et al. |
| 2016/0294624 A1* | 10/2016 | Xia ................... H04L 41/0846 |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

(56) References Cited

OTHER PUBLICATIONS

Wojciech Borowicz et al. "Building Apps in the Age of Beacons and Internet of Things", Mar. 11, 2015. https://uxmag.com/articles/building-apps-in-the-age-of-beacons-and-internet-of-things.

Eileen Burbidge et al. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

Tips for Having a Great Conference. Aver HD Video Conferencing. http://www.averusa.com/video-collaboration/support/video-conferencing-tips.asp. 1991-2015.

VC320. Portable USB Video Conferencing Camera System for Small and Huddle Rooms. 2016.

EVC Series. Meeting collaboration made easy and affordable. http://www.averusa.com/video-collaboration/products/evc-series-video-conferencing.asp. 1991-2015.

AVer VCLink & ScreenShare. http://www.averusa.com/video-collaboration/products/vclink-and-screenshare.asp. 1991-2015.

Portable USB Video Conference Camera System for Small and Huddle Rooms. 1991-2015.

Plug-N-Play USB Video Conference Camera System for Mid to Large Rooms. http://www.averusa.com/video-collaboration/products/vc520-usb-conference-camera.asp. 1991-2015.

So many ways to share. https://getmevo.com/sharing. Downloaded Dec. 12, 2016.

How to Cut to Different Shots. https://help.getmevo.com/hc/en-us/articles/223725908-How-to-Cut-to-Different-Shots. Sep. 27, 2016.

Enable Face Detection. https://help.getmevo.com/hc/en-us/articles/224041827-Enable-Face-Detection. Sep. 27, 2016.

Edit on the fly. https://getmevo.com/mevoapp. Downloaded Dec. 12, 2016.

* cited by examiner

METHOD AND APPARATUS FOR TRANSFERRING INFORMATION BETWEEN ELECTRONIC DEVICES

CROSS-REFERENCE TO RELATED APPLICATIONS

This application is a continuation-in-part of U.S. Patent Application of U.S. patent application Ser. No. 15/166,113, filed on May 26, 2016, which is hereby incorporated herein by reference.

BACKGROUND OF THE INVENTION

Field of the Invention

Embodiments disclosed herein generally relate to methods and electronic devices used to enable the control and distribution of information between two or more electronic devices.

Description of the Related Art

The popularity of portable electronics, such as smartphones, touch pads, PDAs, portable computers and portable music players, has increased dramatically in the past decade. As the number of electronic devices and the reliance on these electronic devices has increased, a need for these devices to interact and interface with each other has increased. One issue with the large increase in the use of electronic devices has been the complexity of the setup of these devices so that they can seamlessly provide the user with useful information and easily communicate with each other without taking a large amount of the user's time to set up.

Video conferencing has also become more popular in recent years, thanks in large part to proliferation of high speed Internet and price reductions in camera equipment. For example, dedicated video conferencing locations exist where rooms and technological resources are dedicated solely to the task of video conferencing. Typically, video conferencing locations include fixed video conferencing hardware that include multiple camera devices and one or more video servers that are capable of controlling the transfer of video conferencing data between the various video conferencing sites.

While video conferencing technology is rapidly improving, it remains challenging to provide sophisticated video conferencing systems that can be easily set up so that users can rapidly and easily interact and transmit information electronically between users at multiple different locations. While dedicated video conferencing environments provide many sophisticated features, such functionality currently comes at a substantial cost and complexity, in large part due to these sophisticated setups requiring many different types of computer hardware that must interact with each other.

Also, as the development of software applications that run on today's portable electronic devices have improved, the usefulness and our reliance on these types of portable electronic devices, such as smart phones, tablets and other similar devices have increased. As the usefulness of the electronic devices has increased, a need for an electronic device and methods of using the same that allow various electronic devices to interface with each other so that desirable information can be automatically and seamlessly provided to a user has increased. In recent years the size of electronic files that are commonly generated, used and shared with other users has greatly increased as the cost of memory has decreased and complexity of the features provided by common presentation, word processing, spreadsheet and/or data analysis types of programs has increased. However, due to the large file sizes generated by most software applications today and the increased internet traffic created by an increase in the number of users of the Internet, it has become much harder to easily distribute information between users in real time, thus causing unwanted delays, and in the video conference case, ineffective and disorganized meetings. Also, when working in a group environment, such as a video conference, the ability to make the files immediately available to each person within the group without having each user navigate through a network or file structure to find and/or open a specific data file has become more complex. Conventional cloud data storage services, such as Dropbox, Box, Google Drive and One Drive, also suffer from similar problems since they require users to navigate through an often complex file structure to access a specific data file. These internet or web based applications also require knowledge of the file structure and multiple user authentication inputs to access and effectively traverse through a predefined file structure.

Therefore, there is need for methods and electronic devices that can be used to rapidly and easily setup, configure and/or control the transfer of information between electronic devices. There is also a need for a method and electronic device that will automatically and seamlessly transfer information between users of two or more electronic devices that are in electronic communication with each other.

SUMMARY OF THE INVENTION

Embodiments disclosed herein generally include a system or a method of controlling the transfer of information between two or more electronic devices due to the interaction of one of the electronic devices with a host identifier signal generating system. In general, the host identifier signal generating system may comprise electrical components that have the capability of storing, processing and/or delivering information to the electronic device so that the electronic device can interact with a desired host device to cause or facilitate the transfer of information from the electronic device to another electronic device.

Embodiments disclosed herein may further include a computer implemented method that includes receiving, at a portable electronic device, a first host identifier signal, transmitting resource locator information from the portable electronic device to a host server via a first communication link, wherein identification of the host server, to which the resource locator information is transmitted, is derived from an analysis of the received first host identifier signal, and the resource locator information identifies a location within a first memory where program information resides, storing the received resource locator information in a second memory of the host server, generating, by the host server, a representation of the resource locator information, and transmitting, by the portable electronic device, at least a portion of the program information to an external electronic device based on the generated representation of the resource locator information. The resource locator information may comprise a text string, a first URL or a first URI.

Embodiments disclosed herein may further include a computer implemented method that includes receiving, at a portable electronic device, a first host identifier signal, transmitting address information from the portable electronic device to a host server via a first communication link, wherein the address information is derived from an analysis of the received first host identifier signal, and the address information comprises resource locator information that identifies a location within a first memory where program information resides, storing the received resource locator information in a second memory of the host server, generating, by the host server, a representation of the resource locator information, and transmitting, by the portable electronic device, at least a portion of the program information to the external electronic device based on the generated representation of the resource locator information.

Embodiments disclosed herein may further include a system for sharing program information by electronic devices, comprising a first host identifier signal generation system and a host server. In some embodiments, the system may also include a portable electronic device that includes software disposed thereon. The first host identifier signal generation system, comprising a first processor, non-volatile memory having host identifier signal information stored therein, and a transceiver that is configured to wirelessly transmit the host identifier signal that comprises a first resource locator information, wherein the first resource locator information identifies the resource location of a host server. The first portable electronic device may comprise a second processor, a transceiver that is configured to receive the host identifier signal information from the first host identifier signal generation system, non-volatile memory having program information stored therein and a number of instructions which, when executed by the second processor, causes the portable electronic device to perform operations comprising analyzing the host identifier signal received from the transceiver, and transmitting a second resource locator information to a host server via a first communication link, wherein the host server is located at the first resource locator information and is selected due to information found in the received host identifier signal, and the second resource locator information identifies a location in a first memory where the program information resides. The host server may comprise a third processor, a transceiver that is configured to receive the transmitted second resource locator information from the first portable electronic device, and non-volatile memory having stored therein and a number of instructions which, when executed by the third processor, causes the host server to perform operations comprising receive the transmitted second resource locator information, store the received second resource locator information in memory of the host server, and generate a representation of the resource locator information.

Embodiments disclosed herein may further include a computer implemented method, comprising receiving, at a portable electronic device, a first host identifier signal, transmitting resource locator information from the portable electronic device to a host server via a first communication link, wherein identification of the host server, to which the resource locator information is transmitted, is derived from an analysis of the received first host identifier signal, and the resource locator information identifies a location within a first memory where program information resides, storing the received resource locator information in a second memory of the host server, transmitting, from the host server, the resource locator information to external electronic devices found on a user access list that is stored in the second memory of the host server, and transmitting, by the portable electronic device, at least a portion of the program information to at least one of the external electronic devices based on the transmitted resource locator information.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
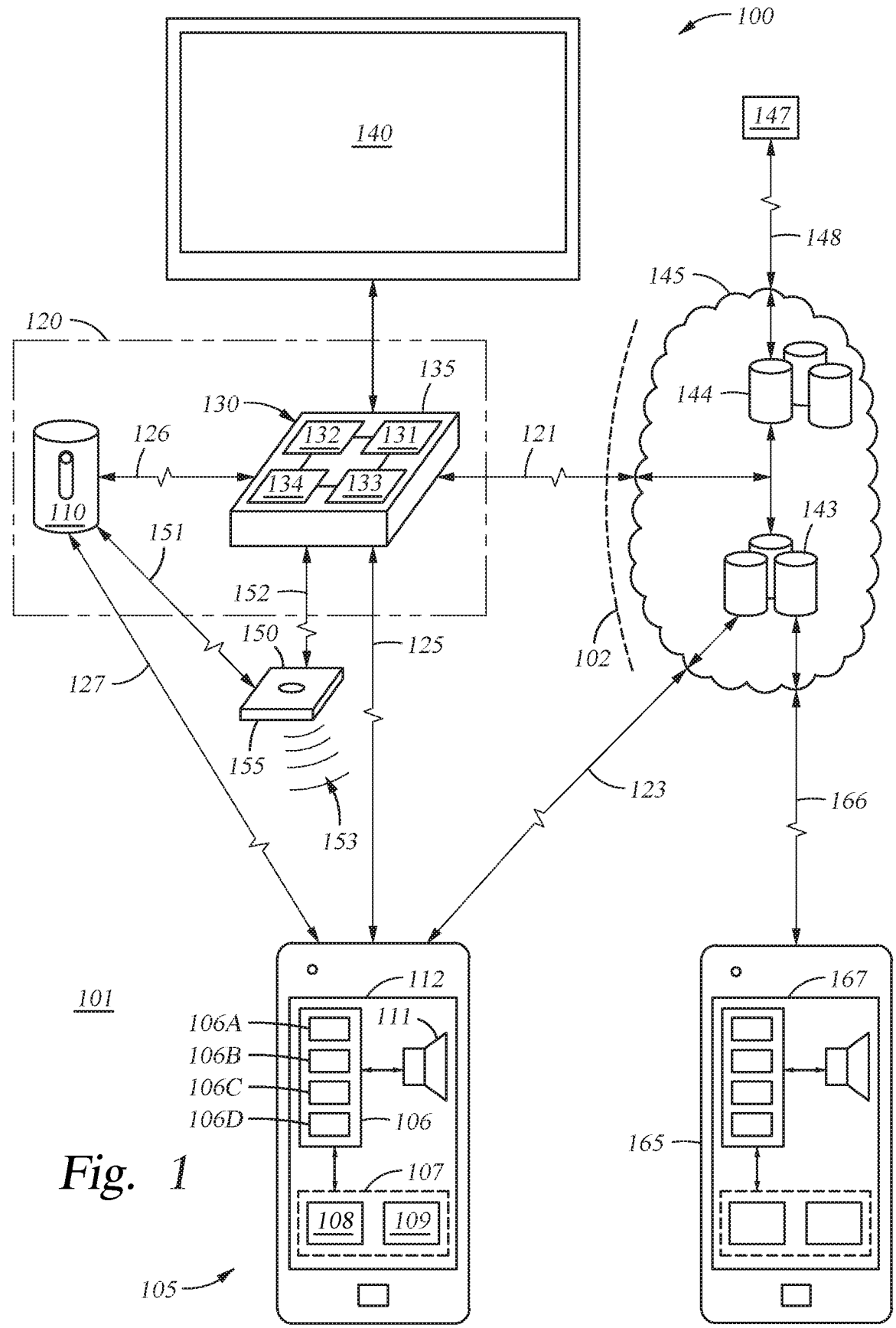
FIG. 1 illustrates an electronic system that includes multiple electronic devices that are interconnected using various communication links, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments of the disclosure provided herein generally include a system and a method of configuring and/or controlling the transfer of information between two or more electronic devices due to the interaction of a portable electronic device with a host identifier signal generating system. Embodiments of the disclosure may include a system and a method of distributing useful information received by or contained within a memory of the portable electronic device based on the receipt of a host identifier signal. The portable electronic device may then perform one or more desirable functions or processes based the portable electronic device's interaction with the host identifier signal generating system. Some aspects of the disclosure provided herein may include an apparatus, method and/or one or more computing device software applications that are configured to more easily setup, configure and/or control the presentation, distribution, collection and/or analysis of program information residing in a first electronic device to a second electronic device based on the interaction of the first electronic device with the host identifier signal generating system. As will be discussed further below, program information, also referred to herein as a data file, may include any type of useful information that one user may want to transfer to another user via an electronic means, such as electronic program or data files that may be transferred via a wired or wireless electronic communication path.

In some embodiments, the apparatus and methods include a host identifier signal generating system that can provide information to a portable electronic device regarding a host device, such as a host server, that the portable electronic device is to interact with to facilitate the transfer of information between the portable electronic device and another electronic device. In some embodiments, to provide an automatic or semi-automatic distribution of information from the portable electronic device to other electronic devices, resource locator information is provided to a desired host device based on a process where the portable electronic device is caused to interact with the host identifier signal generating system. The resource locator information is then posted or distributed to other electronic devices so that they can access the desired program information residing at the address found within the received resource locator information. In one example, a first host identifier signal generating system is adapted to cause one or more software applications running on a portable electronic device to select a host device that is adapted to communicate with the portable electronic device and other electronic devices via a network connection (e.g., local area network (LAN), wide area network (WAN)) or an internet communication link. During operation the host device is configured to store, collect, analyze and/or present the received resource locator information so that an associated set of program information can then be distributed from the portable electronic device to one or more electronic devices that are in communication with the host device.

FIG. 1 is a schematic diagram that illustrates an electronic system 100 that is disposed within an environment 101, and includes at least one host identifier signal generating system 150 that is configured to interact with an electronic device, such as a portable electronic device 105. In general, the host identifier signal generating system 150 is an electronic device that is used in conjunction with one or more portable electronic devices 105. The host identifier signal generating system 150 is generally able to communicate with the portable electronic device 105 using a communication link 153. In some embodiments, the communication link 153 is a one-way communication path in which a transceiver 155 within the host identifier signal generating system 150 is used to transfer, or broadcast, host information contained within a host identifier signal to the portable electronic devices 105. In some configurations, the communication link 153 is a wireless communication path that is enabled by the transmission of a communication signal from the transceiver 155, such as the transmission of a radio signal, infrared signal, ultrasonic signal or other similar communication signal transfer method. Other communication signal transfer methods that may be used include, but are not limited to, Bluetooth (BT), Bluetooth LE, Infrastructure Wireless Fidelity (WiFi), Soft Access Point (AP), WiFi-Direct, and NFC communication methods.

In some embodiments, the electronic system 100 may include the host identifier signal generating system 150 and an auxiliary electronic device that the host identifier signal generating system 150 is associated with by physical proximity and/or by some form of communication link. In one example, as discussed further below, the electronic system 100 includes a host identifier signal generating system 150 that is associated with the auxiliary electronic device that is a video conferencing system 120. The video conferencing system 120 may include a video conferencing controller 130, display 140 and one or more video conferencing devices 110. In this example, the transceiver 155 of host identifier signal generating system 150 is in electrical communication with at least one component found within the video conferencing system 120 via a wired or wireless communication link. In one configuration, the transceiver 155 is in wired or wireless communication with a video conferencing device 110 by way of a communication link 151. The transceiver 155 may additionally or alternately be in wired or wireless communication with a transceiver within the video conferencing controller 130 by way of a communication link 152. In some embodiments, the host identifier signal generating system 150 is part of a component, such as the video conferencing controller 130 or a video conferencing device 110, within the auxiliary electronic device.

In general, the one or more video conferencing devices 110 may be in communication with the video conferencing controller 130 via a wired or wireless communication link 126. The video conferencing controller 130 may be in communication with one or more electrical devices that are positioned and configured to enable the formation of a video conference with other external resources via one or more internet devices positioned on the internet 145 using a communication link 121. Typically, to avoid the loss of sensitive data, the communication link 121 requires information sent to or coming from the video conferencing controller 130 to pass through a firewall 102, which is designed to block unauthorized incoming access while permitting outward communication to one or more of the internet devices. In some cases the communication link 121 may support the transmission of video conference feeds that include audio and video streams, which require the communication link 121 to be formed on a high performance network that is connected to a Local Area Network (LAN) present in each video conference location and/or across multiple video conference locations on a Wide Area Network (WAN). The video conferencing controller 130 may be any form of conventional electronic computing device, which may include a processing system 135. The processing system 135 will typically include memory 133, input/output (I/O) devices 132, and a processor 134, which may include a central processing unit (CPU), a digital signal processor (DSP), and/or application-specific integrated circuits (ASIC), and other useful components. The input/output (I/O) devices 132 typically includes one or more transceivers that are configured to establish wired or wireless communication links, such as the communication links 123, 125 and 127, with other transceivers residing within other computing devices. The memory 133 may include conventional non-volatile memory that has one or more software applications or software programs (not shown) stored therein. In some configurations, one or more of the video conferencing devices 110 may include a video camera device that may include a digital camera (e.g., CCD camera, CMOS camera), a keyboard that is coupled to the video conferencing controller 130, a speaker phone, speaker, or other electronic device that is useful for video conferencing. In one example, one or more of the video conferencing devices 110 may be an Ultimate Ears Boom™ speaker, a Harmony™ universal remote control or a Logitech Connect™ or a Logitech BCC 950™ video conferencing device that are all available from Logitech USA of Newark CA or Logitech Europe S.A of Lausanne, Switzerland.

As is discussed further below, the portable electronic device 105 will generally use a received host identifier signal to determine, by use of one or more software applications found within the portable electronic device 105, what desired activities the portable electronic device 105 will subsequently perform. The information provided from the host identifier signal generating system 150, or host information, may contain host identifier signal generating system identification information, host identifier signal generating system configuration information (e.g., hardware type, serial number, model number, etc.), configuration information about the auxiliary electronic device (e.g., video conferencing system 120) that is associated with the host identifier signal generating system, information about the host identifier signal generating system environment (e.g., conference room attributes, device owner) or other types of device or physical position identifying information (e.g., GPS location). The host information can be stored within memory found within the host identifier signal generating system 150, and transferred from the host identifier signal generating system 150 by way of the transceiver 155. Thus, in some embodiments, the portable electronic device 105 need not contain hardware that is specially configured to interact with the host identifier signal generating system 150, but only requires that the portable electronic device 105 be enabled to communicate with the host identifier signal generating system 150 and have one or more preloaded software applications running in the foreground or background of the portable electronic device 105 that are adapted to perform the one or more desired activities based on the information received in the host identifier signal. As discussed above, in some embodiments, the one or more desired activities may include the automatic or semi-automatic transfer of information between one or more electronic devices due to the interaction of the portable electronic device 105 with the host identifier signal generating system 150.

The host identifier signal generating system 150 may be any technically feasible electronic device configured to interact with one or more portable electronic devices 105. In practice, host identifier signal generating system 150 may be coupled to a power source (e.g., wall outlet), although a host identifier signal generating system 150 may alternately receive power from a battery. In general, the host identifier signal generating system 150 may comprise electrical components that have the capability of storing, processing and/or delivering information to another electronic device, such as the portable electronic device 105. In one embodiment, the host identifier signal generating system 150 includes a conventional electronic computing device. The host identifier signal generating system 150 may include non-volatile memory (not shown), a power source (not shown), input/output (I/O) devices (not shown), and a processor (not shown), as similarly discussed above. The non-volatile memory may include various data files, settings and/or parameters associated with the environment that the host identifier signal generating system 150 is positioned within, information regarding the host identifier signal generating system 150 itself, and in some cases information relating to one or more users of the host identifier signal generating system 150. As noted above, I/O devices within the host identifier signal generating system 150 may include a transceiver 155 that are configured to establish one or more different types of wired or wireless communication links 153 with other transceivers residing within other computing devices. The I/O devices may also include one or more sensors that configured to sense the interaction between a user and the host identifier signal generating system 150 or the portable electronic device 105 and the host identifier signal generating system 150. In some configurations, the one or more sensors may include motion sensing devices (e.g., accelerometers), optical sensing devices, acoustic sensing devices, touch sensing device (e.g., capacitive sensing device) or other similar sensing device.

The portable electronic device 105 can be any type of portable electronic device, such as a cell phone (e.g., smart phone), a tablet computing device, laptop computer, an e-book reader, a portable music player, or other similar electronic device. Examples of a portable electronic device 105 may include, but are not limited to an iPod®, iPhone®, iPad®, Android™ phone, Samsung phone, Samsung Galaxy®, Squeeze™ box, Microsoft Surface®, laptop or other similar device. The portable electronic device 105 may comprise a processing system 106 and memory 107, which may contain stored data 108 and one or more software applications, such as a software program 109. The processing system 106 will typically include input/output (I/O) devices 106A and a processor 106B, which may include a central processing unit (CPU), a digital signal processor (DSP), and/or application-specific integrated circuits (ASIC), and other useful components. The I/O devices 106A within the portable electronic device 105 may include a speaker 111, display device 112, a touch sensing device (not shown) and/or one or more transceivers 106C configured to establish a wired or wireless communication link with other transceivers residing within other computing devices, such as the communication links 123, 125 and 127. The I/O devices 106A within the portable electronic device 105 may also include motion sensing devices (e.g., accelerometers), magnetic field sensing devices, sound sensing devices or other useful sensors that can be used to sense the interaction of the portable electronic device 105 and the host identifier signal generating system 150. The I/O devices may also include one or more timing devices, such as a clock (not shown), that are configured to provide time related information to the processor 106B within the processing system 106. The clock may be a simple IC or similar component, such as a crystal oscillator. The software applications, such as software program 109, may include software applications that are configured to run in the foreground or background on the portable electronic devices 105. The software applications are used to control one or more activities being performed by the portable electronic device 105 and/or provide some useful input to the user via audio or visual means provided by the portable electronic devices 105.

The memory 107 may be any technically feasible type of hardware unit configured to store data. For example, memory 107 could include some form of non-volatile memory, such as a hard disk, a random access memory (RAM) module, a flash memory unit, or a combination of different hardware units configured to store data. Software program 109, which is stored within the memory 107, includes program code that may be executed by processor 106B in order to perform various functionalities associated with the portable electronic devices 105.

The stored data 108 may include any type of information that relates to the configuration or control of the portable electronic device, user data, auxiliary electronic device control information (e.g., video conferencing system control commands), host identifier signal generating system configuration information, useful software applications, or other useful information. In some embodiments, the stored data 108 may include information relating to one or more software applications or tasks being performed by one or more of the software applications stored with the memory 107. The stored data 108 may also include information delivered to and/or received from the host identifier signal generating system 150 at various times, such as information received from a prior interaction between the portable electronic device 105 and the host identifier signal generating system 150. The stored data 108 may reflect various data files, settings and/or parameters associated with the environment and/or desired behavior of the portable electronic device 105. The stored data 108 may also include data files that contain information about the user, such as biometric data, user identification information and/or any other useful information. As mentioned above, software program 109 may be used to configure the portable electronic device 105 based on stored media data 108. The software program 109 may also generate wireless control signals based on the stored data 108 and information derived from a received host identifier signal.

Figure 2:
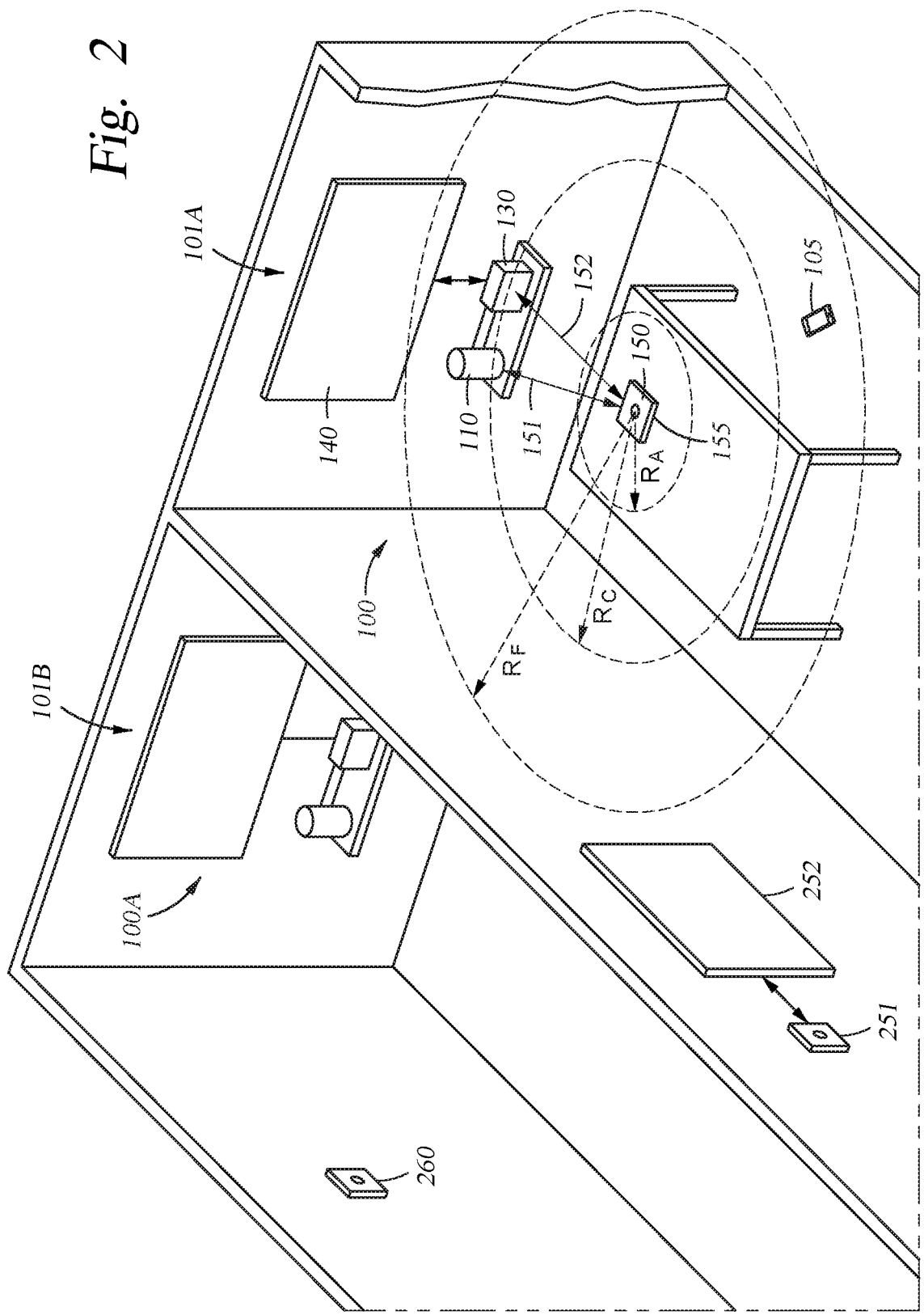
FIG. 2 illustrates multiple electronic devices that are positioned within a conference room environment, according to one embodiment of the present disclosure.

In some embodiments, the I/O devices 106A within the portable electronic device 105 may include a wireless signal strength comparison device 106D that is adapted to detect the signal intensity of one or more wireless signals that are received by a wireless transceiver 106C in the portable electronic device 105. The signal comparison device may also include one or more analog or digital comparison circuits (e.g., OP Amps), and at least one feedback circuit that is able to provide the processor within the processing system 106 with information about the wireless signals (e.g., host identifier signal) received by the host identifier signal generating system 150. In one example, the wireless signal strength comparison device is able to determine the relative power levels of two or more wireless signals that have been received from two or more host identifier signal generating systems, such as the host identifier signal generating system 150, a second host identifier signal generating system 251 (FIG. 2) and/or a third host identifier signal generating system 260 (FIG. 2), which is disposed in an adjacent environment 101B, as is discussed further below. The second host identifier signal generating system 251 or third host identifier signal generating system 260 can be similarly configured as the host identifier signal generating system 150 discussed above. In one configuration, the second host identifier signal generating system 251 may be associated with a second auxiliary electronic device 252 as shown in FIG. 2. Various applications and uses of the wireless signal strength comparison device are further discussed below. In some configurations, the I/O devices 106A may also contain a display 112, a speaker 111, a microphone, navigation related components (e.g., gyroscope components, GPS components), or other desirable and useful features.

The portable electronic device 105 may also separately transmit information to and receive information from an internet connected electronic device that is also positioned within communication range of the host identifier signal generating system 150 via an external communication link 123. In one configuration, the portable electronic device 105 is configured to communicate with an internet connected appliance or device via the external communication link 123 using a wireless communication technique, such as a cellular phone network, WiFi network, satellite communication network or other useful wireless communication technique. In some embodiments, the wireless transceiver 106C is configured to communicate with at least one internet device, such as a host server 143, without needing the communication signals to pass through communication links that pass through the firewall 102, such as communication link 123 shown in FIG. 1. In some embodiments, one or more of the devices used to form the external communication link 123 are different from the devices used to form the communication link 121 used by the video conferencing controller 130. In one example, the external communication link 123 is formed by use of a wireless communication technique, such as a technique that uses a CDMA, GSM, LTE, HSPA+ or WiMax type wireless communication network, versus the communication link 121 that is formed between distributed secure private domains typically connected through firewall protected public access points using wired communication techniques that may include fiber, cable or DSL type data transmission methods/technologies. In another example, the external communication link 123 is formed over a WiFi network that is connected to the internet 145.

In some configurations, as is discussed further below, the internet devices found on the internet 145 may include a host server 143 and one or more internet hosting devices 144, which will be discussed further below. In general, the host server 143 can be positioned at any desired location, but is configured to communicate with one or more of the portable electronic devices (e.g., portable electronic devices 105, 165) via the separate external communication link 123.

Electronic System Configuration and Processing Sequence Examples

Figure 3:
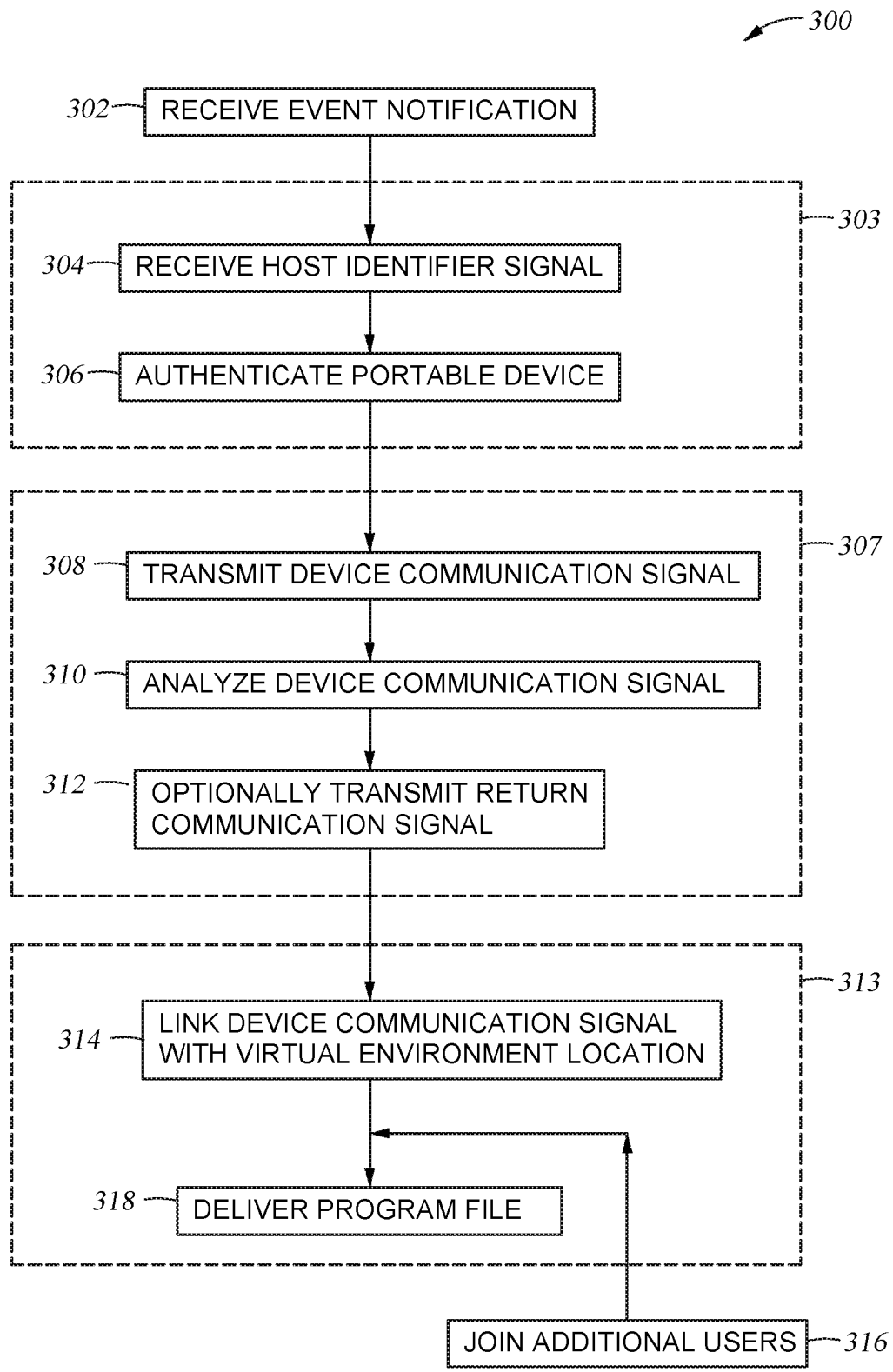
FIG. 3 illustrates a method of configuring and controlling the transfer of information between electronic devices, according to one embodiment of the present disclosure.

FIG. 2 is a schematic diagram of a conferencing environment 101A that contains an electronic system 100 that includes a host identifier signal generating system 150 that is configured to interact with one or more electronic devices, such as the portable electronic device 105. FIG. 3 illustrates a process sequence 300 for configuring and/or controlling the transfer of information between two or more electronic devices based on the interaction of the portable electronic device 105 with the host identifier signal generating system 150. The process sequence 300 generally includes an initiation sequence 303, an operation sequence 307 and an information delivery sequence 313, which are each discussed below.

The process sequence 300 may start with an optional operation 302 in which one or more of the first software applications running on the portable electronic device 105 receive input from a user or generate a prompt that a desired event is to occur. The user input or generated prompt may include the receipt of event information that is delivered to the user. In the case of the prompt, the event information can be retrieved from a memory location within the memory 107. In some cases, the prompt is generated by an event software application (i.e., first software application) that is running in the foreground or background of the portable electronic device 105, and can access the event information stored in memory. The event software application may be a calendar software application (e.g., Microsoft Outlook, Apple Calendar, Google Calendar), video conference software application (e.g., Skype, Google Hangout, Zoom Video, etc.) or other event or communication related software application. The event information may include information relating to the timing of the event, host server's Uniform Resource Locator (URL) information that is associated with the event, or event details (e.g., location of event, attendees of the event, etc.) that are accessed by a software application, such as the calendar application running on the portable electronic device 105. In one example, the host server's URL information is supplied by the user to the first software application at a first time so that an event that occurs at a later time (e.g., second time) can use this information to provide access to some additional information stored locally on the portable electronic device 105 or other memory location that is associated with the portable electronic device 105. Access to the additional information may be gained by generating a representation of or posting a link, such as resource locator information, on a virtual space provided by or within a host server 143. The posted link can be stored on a host server 143 so that it can be provided to other users that are or will be part of the event. At the time the user input or prompt is generated by the first software application, a portion of the first software application, or a second software application that is also running on the portable electronic device 105, is configured to retrieve device configuration information that may be used to facilitate the transfer of a resource locator information to the host server 143. As noted above, the transferred resource locator information will generally include information relating to a location where program information resides. The program information may include information that relates to a file or data that is to be shared by the user of the portable electronic device 105 with other electronic devices that are in communication with the host server. While the discussion below predominantly describes the use of the second software application (e.g., device control application) running on the portable electronic device 105 to perform one or more of the operations in the process sequence 300, this configuration is not intended to be limiting as to the scope of the disclosure provided herein since the operations discussed herein could also be performed by portions of a single software application, such as the first software application discussed above, that have the capability of providing other useful functionalities other than performing the operations described in process sequence 300. In one example, the first software application is a conferencing software application similar to Skype, Google Hangout or Zoom Video.

The event information used in process sequence 300 may also include information relating to the user, such as biometric information (e.g., facial, eye, finger, hand, DNA or saliva information) that can be used to authenticate the user and allow the user to pass one or more security checks found within the process sequence 300. For example, in a video conferencing setting, biometric information about the user can be used in the process of transferring the resource locator information during operation 314, which is discussed further below, to assure that only desired users are allowed to retrieve program information used in a video conference.

As noted above, most portable electronic devices used today are a repository of a large variety of information about the user, the user's activities, biometric information about the user and/or the user's preferences that can be used within the process sequence 300 to more rapidly configure and transfer information between two or more electronic devices, as will be discussed further below. The optional operation 302 can thus be used to collect and/or receive desired user information stored within the portable electronic device 105, which can then be used by one or more of the subsequent operations in the process sequence 300 to more easily and rapidly transfer information using the received user information. The presence of the user related information stored in memory can thus reduce or prevent the need for the user to input data that already resides on the portable electronic device 105 when performing one or more of the subsequent process sequence steps described below.

Initiation Sequence

At operation 304, the initiation sequence 303 portion of the process sequence 300 starts with components in the portable electronic device 105 receiving a host identifier signal from one or more host identifier signal generating systems 150 that are in the communication range of the portable electronic device 105. As noted above, in some embodiments, the communication link 153, by which the portable electronic device 105 receives the host identifier signal, can be a one-way communication link that doesn't require the typical pairing process that is required in most wireless communication technologies, such as Bluetooth® and others. During operation 304 a device control software application, which is running on the portable electronic device 105, is configured to receive, identify and/or parse the information received in the host identifier signal to detect or determine if host information can be found therein. In some embodiments, the device control software application, or hereafter device control application, is continually running in the background of the portable electronic device 105, and is thus able to rapidly detect the receipt of the host identifier signal. In other embodiments, the device control application is first initiated by input from the user, or initiated by the receipt of the event information in operation 302, so that the device control application can then detect the receipt of the host identifier signal.

During operation the host identifier signal can be received by the portable electronic device 105 as the portable electronic device 105 is brought into communication range of a host identifier signal generating system 150. The portable electronic device 105 may be brought into communication range of a host identifier signal generating system 150 as the user brings the portable electronic device 105 into an environment that contains the host identifier signal generating system 150, such as the conferencing environment 101A in FIG. 2. In cases where there are multiple host identifier signal generating systems, such as host identifier signal generating systems 150, 251 and 260 in FIG. 2, it may be difficult for the portable electronic device 105 to determine which of the host identifier signals is the correct one that is to be used going forward in the process sequence 300.

In cases where there are multiple host identifier signal generating systems that are within the communication range of the portable electronic device 105, the device control application may not select the correct host identifier signal and host information that is to be used during subsequent operations. Thus, there is a need to determine if the device control software application has received the correct host identifier signal. At operation 306, the device control software application and electrical components in the portable electronic device 105 are used to authenticate and/or determine which of the received host identifier signal information should be used to perform subsequent parts of the process sequence 300. During operation 306, the device control application determines which of the received host identifier signals are to be used to perform a desired activity based on the interaction with the host identifier signal generating system 150. In an effort to determine which of the received host information should be used to perform subsequent parts of the process sequence 300, the device control application may utilize a physical interaction technique or one or more host identifier signal analysis techniques.

In some embodiments, a physical interaction technique may include providing physical or non-physical (e.g., audible) input from a user to the host identifier signal generating system 150, which causes the host identifier signal generating system 150 to deliver a host identifier signal that is received by the device control program within a desired time. In one example, host identifier signal generating system 150 may include an accelerometer, microphone or touch sensing element that is able to detect an input from the user. The user thus may provide a positive input to the host identifier signal generating system 150 letting it know that the user intends to interact with a specific host identifier signal generating system 150. In one example, the positive input includes causing the portable electronic device 105 to come into contact with a portion of the host identifier signal generating system 150. In some cases, the host identifier signal generating system 150 may then use the received input from the user to generate a host identifier signal at a desired time. The processor 106B in the processing system 106 (FIG. 1) of the portable electronic device 105 may initiate a timer (time $T_0$) based on receiving and detecting the same or similar input from the user as the host identifier signal generating system received. In one example, when the portable electronic device 105 is caused to contact the host identifier signal generating system 150 and sensors in each device are utilized to detect the physical interaction and cause the host identifier signal to be sent by electrical components in the host identifier signal generating system 150 and the timer to be started by the electronic components in the portable electronic device 105. The timing function may be performed by one or more timing devices disposed within the portable electronic device 105. In general, the term "timer," as used herein, is a process that a processor uses to measure, monitor or determine that an amount of time has passed. In some examples, the timer may be a count-down timer, a count-up timer or any other method that allows the processor to determine that an amount of time has passed. Next, when the portable electronic device 105 receives the generated host identifier signal at an input time $T_1$ after the timer was initiated (time $T_0$), the processor 106B will compare the difference between the input time $T_1$ and time $T_0$ for each of the received host identifier signals to determine which of the host identifier signals is closest in time to the reception of the input at the portable electronic device 105, and thus is the desired host identifier signal to use going forward. Alternately, the time difference may be compared with the time window value stored in memory, which can be used to determine if the received host identifier signal has been received within a desired time, and thus the received host identifier signal is the desired host identifier signal to use going forward. For example, if the timing of a detected shock or measured acceleration (e.g., "bump") of the portable electronic device 105 is in the same time frame as a detected shock or measured acceleration of the host identifier signal generating system 150, then it is likely that the electronic device is positioned near the host identifier signal generating system 150, and thus it is the device that the host identifier signal generating system 150 is intended to communicate with going forward. The device control application and processor 106B can thus use the timing of the various received host identifier signals, the initiated timer and stored time window value type information to determine which of the received host identifier signals is the correct host identifier signal to use going forward.

Alternately, in some cases the portable electronic device 105 may use one or more host identifier signal analysis techniques to determine which of the received host identifier signals is the correct host identifier signal to use going forward. In some configurations, each of the host identifier signal generating systems may be separately and continuously delivering host identifier signals at random or regular asynchronous intervals. In some cases, the electrical components in the portable electronic device 105 are used to determine which of the multiple host identifier signal generating systems is generating the desired host identifier signal. In some embodiments, the electrical components may include the processor 106B, wireless signal strength comparison device 106D and memory 107. In one example, the wireless signal strength comparison device 106D may include components that are able to detect the intensity of the signals received from the multiple host identifier signal generating systems that are within communication range of the portable electronic device 105. In one example, the components are able to detect the power level of the received host identifier signal using a received signal strength indicator (RSSI) type technique, and determine which signal is the strongest. In another example, the signal strength comparison device 106D components are able to detect the amount of energy delivered in the host identifier signal using an optical intensity measurement detector (e.g., photovoltaic device, photoresistor, thermopile, etc.) or a mechanical energy detector, such as an ultrasonic energy detector (e.g., microphone). In general, the portable electronic device 105 can be positioned at various distances from a host identifier signal generating system 150 based on the position of the user relative to the host identifier signal generating system 150. Therefore, in some embodiments, the wireless signal strength comparison device 106D can be used to determine the relative distance between the host identifier signal generating system 150 and the portable electronic device 105, such that the device control application within the portable electronic device 105 can determine which of the received host identifier signals is the correct signal to use going forward. In some embodiments, as shown in FIG. 2, the distance that the portable electronic device 105 is from the host identifier signal generating system 150 can be divided into two or more regions, such as an active region $R_A$, a close region $R_C$ and a far or distant region $R_F$, which can be used by the device control application to decide what activities to perform or which host identifier signal to use going forward. The various signal intensity values that are associated with the region distances from the host identifier signal generating system 150, can be stored in memory so that the stored values (e.g., region signal intensity values) can be compared with collected signal intensity data to determine the relative distance and/or in which of the regions the portable electronic device 105 is positioned. The device control application can use the defined regions to determine how the portable electronic device 105 should use the received host information. If the portable electronic device 105 is in close proximity to the host identifier signal generating system 150, such as within the active region $R_A$, the processor 106B will determine that the portable electronic device 105 is close to the host identifier signal generating system 150 based on its relatively high signal intensity level and thus determine that the host identifier signal generating system 150 is the desired host identifier generating device versus the other host identifier signal generating systems 251 or 260. In one example, the active region $R_A$ may include a space that is between about 0.5 centimeters (cm) and 1 meter (m) from the host identifier signal generating system 150, such between about 1 cm and about 500 cm.

If the portable electronic device 105 is within an intermediate region (e.g., between the edge of the active region $R_A$ and the edge of the close region $R_C$), the device control application may use this information to control some aspect of the subsequent process sequence processing steps that is different than the case where the portable electronic device 105 is within the active region. In one example, the portable electronic device 105 is prevented from providing control commands to the video conferencing system 120 if it is within the close region $R_C$.

In some embodiments, the device control application can use a signal intensity measurement technique to continually monitor the relative position of the portable electronic device 105 to the host identifier signal generating system 150 so that the device control application can perform some desired function. In one example, one or more distances that the portable electronic device 105 is from the host identifier signal generating system 150 can trigger the device control application to perform a desired activity, such as extracting or pre-loading data stored in memory (e.g., event information) when the portable electronic device 105 enters the distant region $R_F$ so that the portable electronic device 105 can then offer a more responsive experience when it is positioned in the active region $R_A$. In another example, the device control application can use the relative position information to end a video conference as the user is leaving the environment 101A, ask the user if they intend to leave the video conference if a change in the relative position of the portable electronic device is detected (e.g., move from the close region $R_C$ to the distant region $R_F$), or change the current presenter in the meeting by detecting a change in the relative position of the portable electronic device to the host identifier signal generating system 150 (e.g., move from the close region $R_C$ to the active region $R_A$). One will note that the host identifier signal generating system 150 need not be a stationary electronic device, and thus in some cases could be repositioned relative to the position of the portable electronic device 105 to alter the relationship (e.g., regions $R_A$, $R_C$, $R_F$) of one or more the portable electronic devices 105, 165 relative to the host identifier signal generating system 150 in the environment 101A.

In general, the wireless signal strength comparison device 106D is configured to deliver the derived signal intensity information to the processor 106B, so that the processor 106B and device control application can make decisions regarding the type or part of the received host information that should be transferred in subsequent steps. The processor in the portable electronic device 105 can use the received information and compare it with information stored in its memory to help perform one or more subsequent steps. Once the correct host identifier signal from the desired host identifier signal generating system 150 is determined by the device control application the process sequence 300 will then continue on to the operation sequence 307.

In some embodiments, where multiple host identifier signal generating systems are within the communication range of the portable electronic device 105 and multiple host identifier signals are received, the device control application may generate a prompt that is displayed on the screen 112 of the portable electronic device 105 to allow the user to decide which of the host identifier signals is the correct host identifier signal that is to be used during subsequent operations. As previously discussed, the device control application can use a signal intensity measurement technique to continually monitor the relative position of the portable electronic device 105 to one or more host identifier signal generating systems 150 so that the device control application can use this information to determine which of the host identifier systems is to be used during subsequent operations and generate a desired prompt for the user. The user can then provide input to the portable electronic device 105 letting it know which host identifier signal is to be used going forward, and the process sequence 300 can then continue onto the next operation. The input received from the user relating to a particular host identifier signal can also be stored in memory for use in subsequent activities. The subsequent activities may include the next time the initiation sequence 303 and/or process sequence 300 is used by the portable electronic device 105 so that one or more processes can be completed in a shorter more expedient way the next time the initiation sequence and/or process sequence is performed. The collected user input can be stored as part of the event data stored in the memory 108 for use in subsequent operations. The stored event data may also include an attendee list, or user access list, that is stored in memory 108 so that configurational information for meetings that are commonly repeated can be determined based on a comparison of current and past attendee lists and/or event data, and then used to improve the process of performing the initiation sequence 303 and/or process sequence 300. However, in some embodiments, the access list may additionally or alternately be stored in the memory of the host server 143. The access list may have been stored in the memory 108 or the memory in the host server 143 due to its association with a desired event.

During at least one of the operations performed during the initiation sequence 303 the device control application will parse the information received in a host identifier signal to capture the transmitted host information, which is then used in one or more of the subsequent processing steps. As part of the initiation sequence 303 the device control application may analyze the host information and/or compare the host information with host device information stored in memory of the portable electronic device 105 to further confirm that the host identifier signal was generated by the correct host identifier signal generating system 150 and/or enhance the details provided in the host information for use in later process sequence steps. The stored host device information may include unique host identifier signal generating system identification information, host identifier signal generating system configuration information, information about the environment that the host identifier signal generating system is within or other information that was created from a previous interaction of the portable electronic device 105 with the host identifier signal generating system. In some cases, the detected host identifier signal may cause the processor 1066 to search for event information and/or information relating to the host device that are stored in memory 107. In one example, the receipt of the host identifier signal can initiate the detection of stored information relating to a host device.

Operation Sequence

At operation 308, the operation sequence 307 portion of the process sequence 300 starts with components in the portable electronic device 105 using the information received from the analysis of the received host information (initiation sequence 303) and/or the received event information (operation 302) to determine which host device, such as the host server 143, the portable electronic device 105 needs to communicate with during the subsequent information delivery sequence 313. In some embodiments, the received host information includes configuration information, such as host identifier signal generating system information (e.g. host identification information) that is used by the portable electronic device 105 to determine which host device(s) the portable electronic device 105 needs to communicate with during this operation. In some embodiments, the received host information includes information that can be used to help authenticate the portable electronic device 105 to assure that the correct user and/or device should be able to continue forward with the rest of the process sequence 300. In some cases, the received host information includes authentication codes that can be used in subsequent steps to authenticate the portable electronic device.

During operation 308, the device control application within the portable electronic device 105 generates and transmits one or more device communication signals to a host device based on the analysis of the received host information and/or the received event information. In some embodiments, the device control application is able to access host device address information stored in memory of the portable device 105 so that a desired host server 143 can be determined based on an analysis of at least the received host information. In one example, the stored host device address information may include a list of addresses of one or more host devices that is cross-referenced with host identifier signal generating system identification information to allow a desired host server 143 to be determined based on a comparison of the stored host device address information and the received host information. In other embodiments, the device control application is able to select a desired host device based on solely on an analysis of the received host information and/or the received event information.

The transmitted device communication signal(s) will generally include resource locator information and may also contain host information, event information and/or information derived from the analysis of the host information and/or event information. In one example, the device communication signal contains the resource locator information and information relating to a specific event (e.g., on-going video conference) that allows the host device to decide where to post at least a part of the received resource locator information. In some embodiments, the device communication signal essentially includes the resource locator information that is transmitted to the host device. In general, the resource locator information contains information relating to program information, such as a data file, that is stored within a memory that is accessible to components of the portable electronic device 105. The resource locator information may comprise a text string that defines the location of the program information location. The information stored with the resource locator information may include a URL, URI or other type of web address or link that defines a location where the data file is stored. The resource locator information may also include metadata regarding the program information that is stored within a memory location. In one example, the resource locator information may include text string that includes digital data that has a size that is in the kilobytes (KB) range versus the program information that may include one or more data files that are many megabytes (MB) or gigabytes (GB) in size. In some configurations, the transmitted device communication signal(s) are transmitted by the portable electronic device 105 using the wireless transceiver 106C to the host device, such as the host server 143. The one or more device communication signals may be sent to the host server 143 via an outgoing signal sent by way of the external communication link 123. In an effort to reduce the need for user interaction to initiate the transmission of the device communication signal and time that would be required to transmit data securely through the firewall 102, the external communication link 123 may use devices and/or connection paths different from the devices and connection paths used to form the communication link 121. In some embodiments, the external communication link 123 includes a prior established wireless connection which is typically automatically formed in normal use by a portable electronic device, such as a CDMA, GSM, LTE, HSPA+ or WiMax type wireless communication network connection that is provided to a smartphone, tablet or other similar computing device.

At operation 310, the host device, which is described hereafter as a host server 143, receives and processes the device communication signal(s) received from the portable electronic device 105 so that the transfer of the program information can then be provided to other electronic devices that are in communication with the host server 143. In one example, one or more software applications running on a host server 143 are used to analyze the received device communication signal which is then used in operation 314 by the host server to create a virtual environment, and/or add to an already existing virtual environment, that is associated with a location where the user wants the resource locator information to be posted or an event that the user of the portable electronic device 105 is currently attending or will attend in the future. The analysis of the information received in the device communication signal may include the detection and analysis of the resource locator information, the host information and/or the event information contained therein. The analysis of the received host information or event information can include the process of detecting information relating to the timing of the event, host server's URL information and/or event details (e.g., location of the event, meeting room details) found within the device communication signal. The device communication signal may also contain a list of users and/or their credentials that will allow them to access the virtual environment created by or already formed within the host server 143. In some cases, the provided host information is used by the software applications running on a host server 143 to determine and retrieve information stored within the host server 143 regarding a scheduled event and/or information about the host identifier signal generating system 150 that is then used to select and/or form the virtual environment where the resource locator information is to be posted so that the other users can access the shared program information. In one example, the resource locator information includes a URL that allows other users to access program information, such as a PowerPoint file that is stored within the memory 107 of the portable electronic device 105 during a meeting that is currently being hosted or is going to be hosted by one of the internet connected appliances, such as one of the internet hosting devices 144. The internet hosting devices 144 may be in communication with an external electronic device 147 via a communication link 148. The external electronic device 147 can be any type of electronic device, such as an external video conferencing system which can be similar to the video conference system 120 described herein. In some embodiments, the host server 143 contains a library of stored information about regularly occurring events that enable the seamless setup of discrete and private virtual environment(s), which are hosted by the host server 143, where the resource locator information is to be posted.

During the operation sequence 307, based on the receipt of device communication signals, the host server 143 may also initiate and perform some desired additional function based on the receipt of a device communication signal from the portable electronic device 105. Some of the desired functions may include the initiation of a video conference, storing an access list in memory of the host server 143, sending command signals to initiate a video conference, posting desired information on the internet or performing some other useful activity.

Next, at operation 312, the host server 143 optionally transmits a return communication signal, which includes a notification that the resource locator information has been received. The device control application running on the portable electronic device 105 can then be used to analyze the notification information and then provide a status to the user and/or broadcast a notification signal to the other users that are attending the event.

Information Delivery Sequence

At operation 314, the information delivery sequence 313 portion of the process sequence 300 starts with components in the host server 143 using information received from the analysis of the device communication signal to determine if the provided information needs to be provided to a new virtual environment or a virtual environment that had been previously used or set up by a user, or automatically set up by the software running on the host server 143. In some embodiments, operation 314 includes the creation of a new virtual environment within the host server 143 so that the information provided in the device communication signal can be stored therein. The process of deciding whether a new virtual environment needs to be created, or whether a previously setup virtual environment should be used, can be made based on an analysis of the event information or host identification information contained within the device communication signal. In some embodiments, the transmission of the device communication signal to the host server 143 will cause one or more software applications running on the host server 143 to automatically determine to which virtual environment location the provided information is to be delivered. In one example, the software application running on the host server 143 determines and allocates a memory location for the storage of the provided information, such as the resource locator information, for other users to access. The "provided information" generally does not contain the stored data file itself, but will include information relating to the data file that is stored within a memory that is accessible to components of the portable electronic device 105. In some cases, the information within the device communication signal allows the host server 143 to associate the information within the device communication signal with a virtual environment that is associated with a past, current or future video conferencing activity.

In some embodiments, a virtual environment is formed by use of one or more software applications running on the host server 143 that include various protocols (e.g., communication protocols, user authentication protocols, etc.) and hosting environment applications that are able to retrieve information from an allocated memory location and generate a representation of the information stored within the allocated memory so that the stored information can then be made available and/or delivered to a user by use of a link created between the representation of the stored information and the stored information (e.g., program information or data file). The one or more software applications may be adapted to coordinate various web resource elements that allow for the generation of a representation of the stored information received in the device communication signal on a communication network accessible application or other similar type of application that is accessible to desired users connected to the communication network. In one example, the process of generating the representation of the resource locator information includes making at least a part of the resource locator information accessible to a user via a web page that is accessible to the user that is connected to the Internet. The generated representation of the information may include scripts, links, hypertext and/or images that are made available to other desired users that can access the virtual environment by internal or external communication links. The representation of the information stored within the allocated memory will generally include the resource locator information (e.g., URL, URI or other type of web address or link), which, as noted above, provides a link to a location where a data file is stored. In one example, the resource locator information is represented in the virtual environment as a link that a desired user may access from the Internet. The generated representation of the information may additionally or alternately include inserting the resource locator information in a table that is stored in the host server 143, and is otherwise made available to various users, wherein the table may further include resource locator information relating to other data files associated with an event or other related theme.

In cases where the data file cannot be stored in a shareable storage location within the portable electronic device 105, the data file may be stored in a location that is associated with a portable electronic device 105. The associated memory location may include a separate memory location (e.g., local disk drive, storage space on a server), and thus the received resource locator information will point to the storage location in the externally accessible associated memory location.

In some embodiments, operation 314 may additionally or alternately include a process where the host server 143 sends a link, such as a URL or URI, to the users on the user access list to let them know that the information received in the device communication signal has been stored within a memory location and/or has been associated with a desired virtual environment. In some embodiments, operation 314 may include a process where the host server 143 posts or presents a user accessible link, such as a URL or URI, on a webpage to allow a user to access the information stored within a memory location and/or has been associated with a desired virtual environment. The webpage may be access controlled to assure that only desired users have access to the virtual environment.

In some embodiments, in an effort to assure that only desired users can access a private/secure virtual environment, various access control measures may be controlled by one or more software applications running on the host server. In some embodiments, the one or more software applications running on the host server 143 are able to generate a user access list or use a user access list stored in memory to determine who should have access to the contents presented and maintained within the virtual environment. In one embodiment, the user access list is contained within the received device communication signal. In this case, the user access list may be related to information regarding the attendees of an event that is associated with the provided event information, or alternately the user list may include one or more of the users of the host identifier signal generating system 150. The device control signal may also include information about one or more users (e.g., biometric information) that is collected from the received host information or event information, and thus allow the user to bypass existing security measures provided by the one or more software programs. In other embodiments, other types of authentication data may be added to the device communication signal to allow the user to pass one or more security measures so that the user can access the virtual environment. The authentication data may be derived from emails, texts, user input data, information about the specific device (e.g., device ID) that is sending the device control signal, or other typical communication techniques received by the portable electronic device 105 so that a user can reliably and securely prove that they are one of the users that are allowed to join the video conference. The authentication data may alternately or additionally be derived from face detection software that is used in combination with the camera 110 that is connected to the video conferencing controller 130, sensed biometric data (e.g., user's voice, user's fingerprint) or other desirable authentication producing technique. In other embodiments, the user access list can be generated by the one or more software applications based on the event information or host identification information contained within the device communication signal. In this case, the authentication credentials provided by a user that has been routed to the virtual environment, possibly due to their interaction with the host identifier signal generating system 150 or other host identifier signal generating system 150, can be compared with information contained within the received device communication signal, thus allowing access to the information provided therein.]

At operation 316, one or more additional electrical devices can then be used to access the information, such as the resource locator information, stored within the virtual environment. In some embodiments, the one or more additional electrical devices may be the second electronic device 165 that is connected to the host server 143 via the internet 145 using an external communication link 166. In one example, the external communication link 166, which is similar to the external communication link 123, is formed by use of a wireless communication technique, such as a technique that uses a CDMA, GSM, LTE, HSPA+ or WiMax type wireless communication network. In another example, the external communication link 166 is formed over a WiFi network that is connected to the internet 145. The second electronic device 165 can be any form of electronic device, such as a cell phone, tablet computing device, laptop computer, an e-book reader, a portable music player, electronic whiteboard, touch screen display, video projector, television, home automation component or other similar electronic device that may provide some useful input directly to a user. In some cases, the second electronic device 165 may be same type of device as the portable electronic device 105.

During operation 316, the second electronic device 165 may provide a device communication signal to the host server 143 via the internet 145 using the external communication link 166. The device communication signal provided by the second electronic device may be formed by following a process similar to one or more of the operations 302-310 described above, however, performed by the use of the second electronic device 165 and event and/or host information stored therein. At least part of the processes performed during operation 316 may be similar to the processes performed during operations 303 and 307, which are described above.

At operation 318, the second electronic device 165 is directed to the virtual environment created or defined during operation 314 due the interaction of the second electronic device 165 and the host identifier signal generating system 150, or a second host identifier signal generating system 251. In this case, one or more software applications running on the second electronic device 165 may be directed by one or more software applications running on the host server 143 to the virtual environment based on an analysis of the information found in a device communication signal provided to the host server 143 by the second electronic device 165 based on event information or host identifier signal, which was received by the second electronic device 165 from the signal generating system 150 or a second host identifier signal generating system 251. In some embodiments, the one or more software applications running on the second electronic device 165 may be directed to the virtual environment based on a link, such as a URL or URI, sent to the users by the host server 143, as discussed above. In some cases, the user of the second electronic device 165 may manually navigate to the location using a web browser (e.g., manual process) or other similar process.

The user of the second electronic device 165 can then select the link found within the virtual environment which then allows the second electronic device 165 to access the data file(s) stored within a memory location associated with the portable electronic device 105, or within the portable electronic device 105, that is associated with the link. In other words, the second electronic device 165 may send a request to the host server to access the program information residing on the portable electronic device 105, where in the received request is derived from the user selecting the representation of the resource locator information posted on the virtual environment. In one embodiment, the second electronic device 165 is able to access the program information stored within the portable electronic device 105 through the host server 143 by use of the communication links 123 and 166. In other embodiments, selection of the link stored in the virtual environment during operation 314 causes the second electronic device 165 to directly access the data file(s) stored within an associated memory location of the portable electronic device 105, or stored within the portable electronic device 105, through a new communication link (not shown) that is created between the second electronic device 165 and the portable electronic device 105. The new communication link may be formed by Bluetooth pairing process or other similar process that is initiated between both devices due to the process of selecting the link stored within the virtual environment.

In some embodiments, the transmission of the program information (e.g., data file) stored within the portable electronic device 105 or memory location associated with the portable electronic device 105 to the second electronic device 165 may cause one or more software applications running on the second electronic device 165 to cause information to be provided to the user of the second electronic device 165 regarding the program information and/or an activity related to the program information and an on-going event. In one example, at least a portion of the transferred program information may then be displayed on the display 167 of the second electronic device 165. Also, in some cases, the one or more software applications running on the second electronic device 165 may also provide or cause information to be provided to the host server 143 which then causes software applications running on the host server 143 to provide information (e.g., new link (URL or URI)) to the virtual environment relating to fact that the second electronic device 165 has received the program information and can then be an access point for other future users.

Therefore, by following the processes described above, information can be readily transferred between one or more electronic devices by use of one or more host identifier signal generating systems, software applications running on the portable electronic device and/or one or more software applications running on the host server 143. In one example, the processes described above can be used to transfer information between users of a video conference device before, during or after a video conference. In another example, the user causes the portable electronic device 105 to interact with an electronic whiteboard that includes a second host identifier signal generating system 251 therein. Based on the interaction of the portable electronic device 105 with the second host identifier signal generating system 251, the portable electronic device 105 is able to send resource locator information within a device communication signal to the host server 143, which then causes the host server to wake-up, store and/or generate a representation of the resource locator information within a virtual environment so that other event (e.g., video conference) attendees at other remote locations can access a large data file stored within, or associated with, a second auxiliary electronic device 252, and then display information (e.g., resource locator information) relating to the data file on their local displays.

One will appreciate that the device control software within the portable electronic device 105 and methods provided herein in some cases may not require that the portable electronic device 105 have any prior knowledge about the host server 143, since this information can be provided to the portable electronic device 105 based on the received host information that is derived from the information received within the host identifier signal. Moreover, the methods provided herein do not require that the software applications (e.g., video conferencing software) running on the host server 143 have any prior knowledge of or interaction with the portable electronic device 105 prior to performing parts of the information delivery sequence 313. Therefore, the hardware and computer implemented methods disclosed herein need not be specially designed to work with the devices that they are to interact with during the performance of the process sequence 300, since in most cases the portable electronic device 105 need only be able to transfer the necessary device control information to the host server 143. Similarly, the device control software within the second electronic device 165 and methods provided herein do not require the second electronic device 165 have any prior knowledge about the event that it is intended to attend or host server 143, since this information can be provided to the second electronic device 165 based on the received host information or resident event information. Therefore, many differently manufactured and/or configured electronic devices can be setup, configured and/or reliably controlled by use of the electronic system 100 described herein. Moreover, since the device communication signal provided to the virtual environment by the portable electronic device 105 need only contain information relating to the location of the data file (e.g., resource locator information), the time consuming, memory intensive and/or complicated process of transferring the data file to the users at the event, and other users that asynchronously join the event, can be avoided.

Embodiments of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The computer-readable storage media will include non-volatile memory that contains computer readable instructions, such that when the computer readable instructions are executed by a processor, the processor will cause a computer implemented method to be performed.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer implemented method, comprising:
   receiving, at a portable electronic device, a first host identifier signal from a host identifier signal generating system;
   identifying a host server using information derived from the received first host identifier signal;
   transmitting resource locator information from the portable electronic device to the host server via a first communication link, wherein the resource locator information identifies a location within a first memory of the portable electronic device where program information resides;
   storing the received resource locator information in a second memory of the host server;
   generating, by the host server, a representation of the resource locator information to be displayed on an external electronic device; and
   transmitting, by the portable electronic device, at least a portion of the program information to the external electronic device based on a user of the external electronic device selecting the generated representation of the resource locator information.

2. The computer implemented method of claim 1, further comprising:
   receiving, by the host server, a request to access the program information from the external electronic device, wherein the received request is derived from the representation of the resource locator information.

3. The computer implemented method of claim 1, wherein the resource locator information essentially comprises a text string.

4. The computer implemented method of claim 1, wherein the resource locator information comprises a first URL or a first URI.

5. The computer implemented method of claim 1, wherein the first communication link is a wireless communication link formed on a CDMA, GSM, LTE, HSPA+ or WiMax communication network.

6. The computer implemented method of claim 1, wherein the transmitted resource locator information is transmitted within a device communication signal provided from the portable electronic device, and the device communication signal further comprises event information or host information; and
   the computer implemented method of storing the received resource locator information further comprises allocating a location within the second memory of the host server to store the resource locator information based on an analysis of the device communication signal.

7. The computer implemented method of claim 1, wherein storing the received resource locator information further comprises generating a virtual environment using one or more software applications running on the host server, and wherein generating the virtual environment includes allocating a location within the second memory of the host server based on an analysis of a device communication signal in which the received resource locator information is contained.

8. The computer implemented method of claim 7, wherein the device communication signal further comprises event information.

9. The computer implemented method of claim 1, wherein generating the representation of the resource locator information comprises making at least a part of the resource locator information accessible to a user via a web page that is accessible on the Internet.

10. The computer implemented method of claim 1, further comprising transmitting the resource locator information to at least one user found on a user access list that is stored within the second memory of the host server.

11. The computer implemented method of claim 1, wherein the host identifier signal generation system comprises:
 a first processor;
 non-volatile memory having host identifier signal information stored therein; and
 a transceiver that is configured to wirelessly transmit the host identifier signal that comprises a first resource locator information, wherein the first resource locator information identifies the resource location of a host server.

12. The computer implemented method of claim 11, wherein the host identifier signal generation system is external to the host, the portable electronic device, and the electronic device.

13. A computer implemented method, comprising:
 receiving, at a portable electronic device, a host identifier signal from a host identifier signal generating system;
 identifying a host server using information derived from the received host identifier signal;
 transmitting a device communication signal from the portable electronic device to the host server via a first communication link, wherein the device communication signal comprises resource locator information that identifies a location where program information resides within a memory of the portable electronic device;
 storing the received resource locator information in a memory of the host server;
 generating, by the host server, a representation of the resource locator information to be displayed on an external electronic device; and
 transmitting, by the portable electronic device, at least a portion of the program information to an external electronic device based on a user of the external device selecting the generated representation of the resource locator information.

14. The computer implemented method of claim 13, further comprising:
 receiving, by the host server, a request to access the program information from the external electronic device, where in the received request is derived from the representation of the resource locator information, and
 then transmitting the at least a portion of the program information to the external electronic device.

15. The computer implemented method of claim 13, wherein the resource locator information essentially comprises a text string.

16. The computer implemented method of claim 13, wherein the resource locator information comprises a first URL or a first URI.

17. The computer implemented method of claim 13, wherein the first communication link is a wireless communication link formed on a CDMA, GSM, LTE, HSPA+ or WiMax communication network.

18. The computer implemented method of claim 13, wherein the device communication signal further comprises event information or host information; and
 the storing of the received resource locator information further comprises allocating a location within the memory of the host server to store the resource locator information based on an analysis of the device communication signal.

19. The computer implemented method of claim 13, wherein storing the received resource locator information further comprises generating a virtual environment using one or more software applications running on the host server, and wherein generating the virtual environment includes allocating a location within the memory of the host server based on an analysis of the device communication signal.

20. The computer implemented method of claim 19, wherein the device communication signal further comprises event information.

21. The computer implemented method of claim 13, wherein generating the representation of the resource locator information comprises making at least a part of the resource locator information accessible to a user via a web page that is accessible on the Internet.

22. A system for sharing program information by electronic devices, comprising:
 a host identifier signal generation system, comprising:
  a first processor;
  a non-volatile first memory having host identifier signal information stored therein; and
  a first transceiver that is configured to wirelessly transmit a host identifier signal that comprises a first resource locator information, wherein the first resource locator information identifies the resource location of a host server;
 a portable electronic device, comprising:
  a second processor;
  a second transceiver that is configured to receive the host identifier signal from the first host identifier signal generation system;
  a non-volatile second memory having program information stored therein and a number of instructions which, when executed by the second processor, causes the portable electronic device to perform operations comprising:
   identifying the host server using the first resource locator information derived from the host identifier signal;
   transmitting a second resource locator information to the host server via a first communication link, wherein the second resource locator information identifies a location in the second memory where the program information resides; and
   transmitting at least a portion of the program information based on a user of an external device selecting a representation of the second resource locator information; and
 the host server, comprising:
  a third processor;
  a third transceiver that is configured to receive the transmitted second resource locator information from the portable electronic device; and
  a non-volatile third memory having a number of instructions stored therein which, when executed by the third processor, causes the host server to perform operations comprising:
   receiving the transmitted second resource locator information;

storing the received second resource locator information in memory of the host server; and generating the representation of the second resource locator information to be displayed on the external electronic device.

23. The system of claim 22, wherein generating the representation of the second resource locator information comprises making at least a part of the second resource locator information accessible to a user via a web page that is accessible on the Internet.

24. A computer implemented method, comprising:

receiving, at a portable electronic device, a host identifier signal from a host identifier signal generating system;

identifying a host server using information derived from the received host identifier signal;

transmitting resource locator information from the portable electronic device to the host server via a first communication link, wherein the resource locator information identifies a location within a first memory of the portable electronic device where program information resides;

storing the received resource locator information in a second memory of the host server;

transmitting, from the host server, the resource locator information to external electronic devices found on a user access list that is stored in the second memory of the host server; and transmitting, by the portable electronic device, at least a portion of the program information to at least one of the external electronic devices based on a user of the external electronic device selecting the transmitted resource locator information.

\* \* \* \* \*